(12) United States Patent
Tamura

(10) Patent No.: US 6,519,126 B2
(45) Date of Patent: Feb. 11, 2003

(54) ANTI-REVERSE CONNECTION CIRCUIT FOR POWER SUPPLY

(75) Inventor: Hideki Tamura, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/808,336

(22) Filed: Mar. 14, 2001

(65) Prior Publication Data

US 2001/0024108 A1 Sep. 27, 2001

(30) Foreign Application Priority Data

Mar. 17, 2000 (JP) .......................................... 2000-081861

(51) Int. Cl.[7] ................................................. H02H 3/18
(52) U.S. Cl. ........................................... 361/84; 307/127
(58) Field of Search ............................ 307/127; 361/82, 361/84

(56) References Cited

U.S. PATENT DOCUMENTS

| | | | | | |
|---|---|---|---|---|---|
| 4,027,233 | A | * | 5/1977 | Renz ........................... | 307/127 |
| 5,519,557 | A | * | 5/1996 | Kopera et al. ................ | 361/84 |
| 5,519,559 | A | * | 5/1996 | Dides et al. ................. | 307/127 |
| 5,715,128 | A | * | 2/1998 | Uchikawa ..................... | 361/84 |
| 6,239,515 | B1 | * | 5/2001 | Mackel et al. ............... | 307/127 |
| 6,262,492 | B1 | * | 7/2001 | Sheng ......................... | 307/127 |

FOREIGN PATENT DOCUMENTS

JP          Hei 10-336905           12/1998    ............. H02J/7/00

* cited by examiner

*Primary Examiner*—Jeffrey Sterrett
(74) *Attorney, Agent, or Firm*—Brinks Hofer Gilson & Lione

(57) ABSTRACT

An anti-reverse connection circuit for a power supply comprises an input terminal connected to a positive polarity of an external power supply, an input terminal connected to a negative polarity of the external power supply, load terminals connected to a load, a relay having a normally opened contact and an excitation coil, and a control circuit for allowing a current to flow in the excitation coil. Either one of the input terminal and the load terminal, and the input terminal and the load terminal is connected to each other via the normally opened contact, and the other thereof is directly connected to each other. Only when the positive polarity is connected to the input terminal and the negative polarity is connected to the input terminal, a switch transistor of the control circuit is turned on to allow a current to flow in the excitation coil, thereby closing the normally opened contact.

8 Claims, 3 Drawing Sheets

ANTI-REVERSE CONNECTION CIRCUIT FOR POWER SUPPLY

BACKGROUND OF THE INVENTION

1. Field of the Invention

The present invention relates to an anti-reverse connection circuit for a power supply, and particularly to an anti-reverse connection circuit for a power supply, which prevents a reverse voltage from being applied to a load such as a control circuit for fit-up equipment activated by in-vehicle electricity, due to a reverse connection of an external power supply such as a battery to the load.

2. Description of the Related Art

A conventional power-supply anti-reverse connection circuit will be described with reference to FIG. 6. In FIG. 6, the power-supply anti-reverse connection circuit comprises an input terminal 11 connected to a positive polarity of an external power supply (BATT), an input terminal 12 connected to a negative polarity of the external power supply, load terminals 13 and 14 to which a load is connected, and a rectifier cell or device (e.g., diode) 15.

Further, the diode 15 is placed between the input terminal 11 and the load terminal 13. The anode of the diode 15 is connected to the input terminal 11, and the cathode thereof is connected to the load terminal 13. Further, the input terminal 12 and the load terminal 14 are directly connected to each other.

When the external power supply is correctly connected in such a configuration, i.e., when a positive-polarity voltage (e.g., +12V) is applied to the input terminal 11 from the external power supply and a negative-polarity voltage (e.g., 0V) is applied to the input terminal 12, the diode 15 is brought to a conducting state, so that the voltage supplied from the external power supply is applied between the load terminals 13 and 14 through the diode 15. The voltage applied at this time results in a voltage obtained by subtracting a voltage drop (which ranges from 0.6V to 0.7V) developed across the diode 15 from the voltage supplied from the external power supply.

When the external power supply is connected in the backward direction, i.e., when the negative-polarity voltage (e.g., 0V) is applied to the input terminal 11 and the positive-polarity voltage (e.g., +12V) is applied to the input terminal 12, the diode 15 is brought to a non-conducting state, so that a current flowing between the input terminal 11 and the load terminal 13 is cut off. Thus, no voltage is applied between the load terminals 13 and 14.

As described above, the conventional power-supply anti-reverse connection circuit has used rectifying action of the diode to prevent the application of a reverse voltage to a load when the external power supply is connected in the backward direction.

However, when the current used up or consumed by the load increases, power consumption of the rectifier cell or device (diode 15) increases. It is necessary to increase the absolute maximum rating for the rectifier device for the purpose of solving it. It is therefore necessary to increase the size of the rectifier cell itself. The price of the rectifier device also rises and a structure for its radiation becomes complex, thereby exerting pressure on the size of a product. Thus, the price of each product which utilizes such a power-supply anti-reverse connection circuit, also has increased.

Further, since the voltage is applied to the load through the rectifier device within the power-supply anti-reverse connection circuit, a voltage drop (which ranges from 0.6V to 0.7V) based on a PN junction of the rectifier device takes place in the circuit. Therefore, this interferes with the operation of a load circuit and the efficiency is greatly reduced.

SUMMARY OF THE INVENTION

The present invention has been made to solve the problems referred to above. An object of the present invention is to provide a power-supply anti-reverse connection circuit which prevents a reduction in the voltage applied to a load and eliminates the need for a layout with respect to radiation even if current consumption of the load increases, and which avoids an increase in price.

In order to-solve the above problems, the present invention comprises a first input terminal to be connected to a positive polarity of an external power supply, a second input terminal to be connected to a negative polarity of the external power supply, a first load terminal to which one end of a load is connected, a second load terminal to which the other end of the load is connected, a relay having a normally opened contact and an excitation coil, and a control circuit for allowing a current to flow in the excitation coil. Either one of both the first input terminal and the first load terminal, and the second input terminal and the second load terminal is connected to each other via the normally opened contact and the other thereof is directly connected to each other. The control circuit causes the current to flow in the excitation coil only when the positive polarity is connected to the first input terminal and the negative polarity is connected to the second input terminal. Thus, no heat is generated even if the current used up or consumed by the load increases or the current consumption of the load is made great, and no voltage drop is developed between the voltage supplied from the external power supply and each of the load terminals. Accordingly, the efficiency is not reduced. Further, an increase in cost is not produced either.

In the present invention as well, when the voltage supplied from the external power supply is lower than a predetermined voltage, the control circuit inhibits the flow of the current in the excitation coil. Thus, since no voltage is applied to the load when the voltage supplied from the external power supply is low, a failure in load, a malfunction thereof, the shortening of life of the external power supply, etc. can be prevented from occurring.

Further, in the present invention, the control circuit has a resistance-based voltage divider circuit connected between the first input terminal and the second input terminal, and a first switch transistor. The collector and emitter of the first switch transistor are respectively connected to the first input terminal and the second input terminal in such a manner that a current flows from the first input terminal to the second input terminal through the collector and emitter of the first switch transistor when the first switch transistor is turned on. The excitation coil is interposed in a passage through which the current flows. A voltage divided by the voltage divider circuit is applied to the base of the first switch transistor. Thus, since the current flowing in the excitation coil is turned on/off in association with the turning on/off of the switch transistor according to only the connection or disconnection of the power supply, the switching between the turning on and off of the current in the excitation coil can easily be performed.

Furthermore, in the present invention, the control circuit includes a zener diode whose cathode is connected to the first input terminal, a bias resistor connected between the anode of the zener diode and the second input terminal, and an NPN type second switch transistor of which the collector is connected to the first input terminal and the emitter is connected to the second input terminal. The base of the second switch transistor is connected to a point where the zener diode and the bias resistor are connected to each other. The excitation coil is interposed either between the collector of the second switch transistor and the first input terminal or between the emitter of the second switch transistor and the second input terminal. Thus, since the switch transistor is not turned on when the voltage supplied from the external power supply is less than or equal to a zener voltage, the setting of the voltage applied to the load can easily be set to an allowable minimum voltage.

Still further, in the present invention, the control circuit includes a zener diode whose anode is connected to the second input terminal, a bias resistor connected between the cathode of the zener diode and the first input terminal, and a PNP type third switch transistor whose collector is connected to the second input terminal and whose emitter is connected to the first input terminal. The base of the third switch transistor is connected to a point where the zener diode and the bias resistor are connected to each other. The excitation coil is interposed either between the collector of the third switch transistor and the second input terminal or between the emitter of the third switch transistor and the first input terminal. Thus, since the switch transistor is not turned on when the voltage supplied from the external power supply is less than or equal to the zener voltage even if the switch transistor is a PNP type, the setting of the voltage applied to the load to an allowable minimum voltage can easily be performed.

Still further, in the present invention, the first switch transistor is an NPN type. A capacitor for noise elimination is connected between the base of the first switch transistor and the second input terminal. An anti-reverse current diode is interposed in a passage through which a current flows from the first input terminal to the second input terminal through the collector and emitter of the first switch transistor when the first switch transistor is turned on. Thus, it is possible to prevent the switch transistor from malfunctioning due to an abnormal or improper voltage and prevent the switch transistor from destroying due to a reverse voltage.

Still further, in the present invention, the first switch transistor is a PNP type. A capacitor for noise elimination is connected between the base of the first switch transistor and the first input terminal. An anti-reverse current diode is interposed in a passage through which a current flows from the first input terminal to the second input terminal through the collector and emitter of the first switch transistor when the first switch transistor is turned on. Thus, even if the switch transistor is of the PNP type, the switch transistor can be prevented from malfunctioning due to an abnormal or improper voltage, and the switch transistor can be prevented from being destroyed due to a reverse voltage.

Still further, in the present invention, a capacitor for noise elimination is connected between the base of the second switch transistor and the second input terminal. An anti-reverse current diode is interposed in a passage through which a current flows from the first input terminal to the second input terminal through the collector and emitter of the second switch transistor when the second switch transistor is turned on. Thus, the switch transistor can be prevented from malfunctioning due to an abnormal voltage, and the switch transistor can be prevented from being destroyed due to a reverse voltage.

Still further, in the present invention, a capacitor for noise elimination is connected between the base of the third switch transistor and the first input terminal. An anti-reverse current diode is interposed in a passage through which a current flows from the first input terminal to the second input terminal through the collector and emitter of the third switch transistor when the third switch transistor is turned on. Thus, the switch transistor can be prevented from malfunctioning due to an abnormal voltage, and the switch transistor can be prevented from being destroyed due to a reverse voltage.

DETAILED DESCRIPTION OF THE PREFERRED EMBODIMENTS

Power-supply anti-reverse connection circuit according to the present invention will hereinafter be described with reference to FIGS. 1 through 5.

Figure 1:
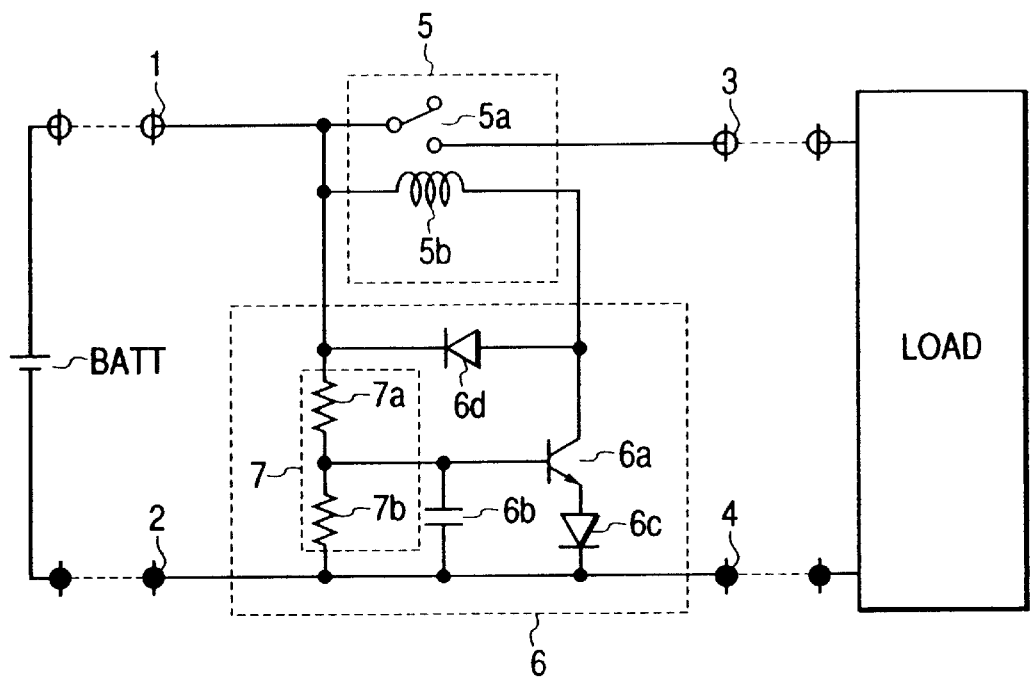
FIG. 1 is a circuit diagram showing a first embodiment of a power-supply anti-reverse connection circuit of the present invention.

FIG. 1 is a circuit diagram showing a first embodiment of a power-supply anti-reverse connection or reverse-connection prevention circuit of the present invention. The first embodiment comprises a first input terminal 1 connected to the positive polarity of an external power or power supply (BATT), a second input terminal 2 connected to the negative polarity of the external power supply, a first load terminal 3 to which one end of a load is connected, a second load terminal 4 to which the other end of the load is connected, a relay 5 having a normally opened contact 5a and an excitation coil 5b, and a control circuit 6 for causing a current to flow in the excitation coil 5b. Incidentally, the relay 5 makes use of a small and inexpensive one.

Further, the input terminal 1 and the load terminal 3 are connected to each other through the normally opened contact 5a. The input terminal 2 and the load terminal 4 are directly connected to each other.

The control circuit 6 includes a voltage dividing or divider circuit 7 having bias resistors 7a and 7b connected between the input terminal 1 and the input terminal 2, and a first switch transistor 6a. Further, the collector of the switch transistor 6a is connected to the input terminal 1 through the excitation coil 5b, and the emitter thereof is connected to its corresponding anode of an anti-reverse current diode 6c. The cathode of the diode 6c is connected to the input terminal 2. Further, the base of the switch transistor 6a is connected to a point where the bias resistors 7a and 7b are connected, and connected to the input terminal 2 through a capacitor 6b for noise elimination. Incidentally, if the excitation coil 5b and the diode 6c exist within a channel or passage of a current which flows from the input terminal 1 to the input terminal 2 through the collector and emitter of the switch transistor 6a, then they are identical in function to each other even if they are located in any place.

When the external power supply is correctly connected in such a configuration, i.e., when a positive-polarity voltage (e.g., +12V) is applied to the input terminal 1 from the external power supply and a negative-polarity voltage (e.g., 0V) is applied to the input terminal 2, a voltage divided by the bias resistors 7a and 7b is applied to the base of the switch transistor 6a, so that the switch transistor 6a is turned on. When the switch transistor 6a is turned on, a current flows from the input terminal 1 to the input terminal 2 through the collector and emitter of the switch transistor 6a, i.e., the current flows even in the excitation coil 5b. As a result, the normally opened contact 5a of the relay 5 is closed so that the voltage (12V) from the external power supply is applied between the load terminals 3 and 4. At this time, the diode 6c serves so as to prevent the flow of a reverse current in the switch transistor 6a, and the capacitor 6b serves as a filter capacitor which prevents a malfunction of the switch transistor 6a when an abnormal or improper voltage (transient voltage, surge voltage) is applied to the input terminal 1. Further, a diode 6d connected in parallel with the excitation coil 5b is used for absorbing and eliminating a back electromotive voltage developed upon turning on/off of the excitation coil 5b.

When the external power supply is connected in the backward direction, i.e., when the negative-polarity voltage (e.g., 0V) is applied to the input terminal 1 from the external power supply and the positive-polarity voltage (e.g., +12V) is applied to the input terminal 2, the voltage applied to the base of the switch transistor 6a becomes lower than the voltage applied to the emitter thereof. Therefore, the switch transistor 6a is not turned on (kept off). Accordingly, no current flows in the excitation coil 5b and hence the normally opened contact 5a remains open, whereby no antipolarity voltage is applied between the load terminals 3 and 4.

Meanwhile, since the relay 5 is used in place of the rectifier cell or device 15 employed in the conventional example, no heat is generated even if the current used up or consumed by a load increases, and no voltage drop is developed between the voltages supplied from the external power supply and the load terminals 3 and 4. Accordingly, the efficiency is not reduced. Further, an increase in cost is not produced either.

Figure 2:
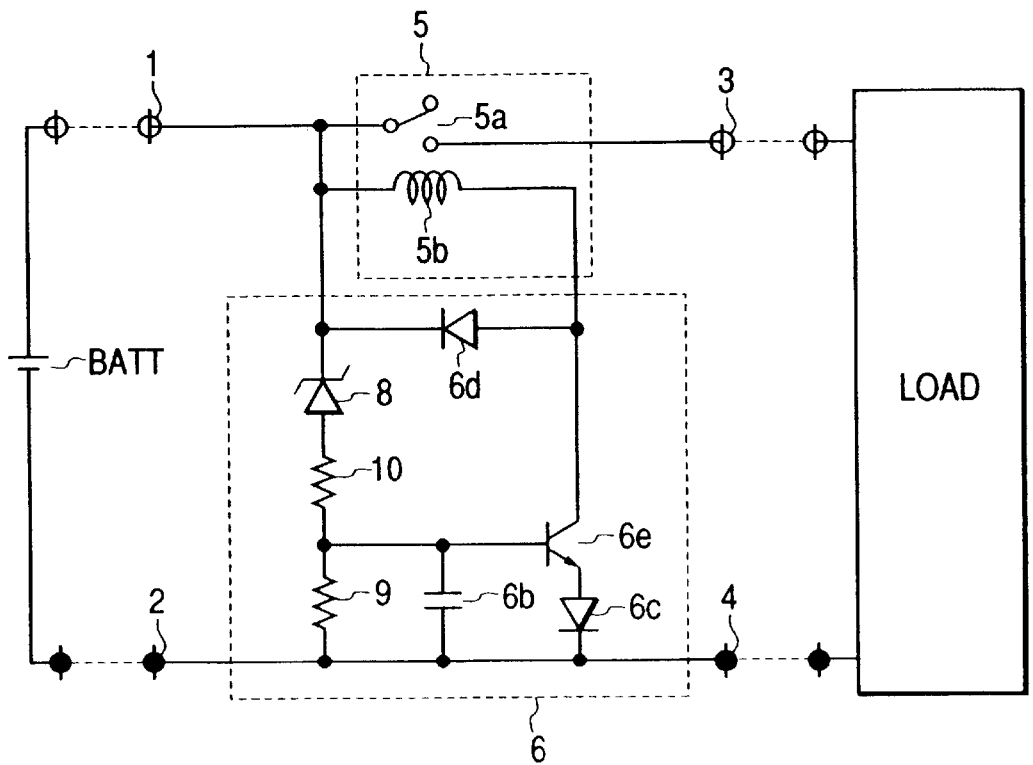
FIG. 2 is a circuit diagram illustrating a second embodiment of a power-supply anti-reverse connection circuit of the present invention.

Next, FIG. 2 is a circuit diagram showing a second embodiment of a power-supply anti-reverse connection circuit of the present invention. In FIG. 2, the same elements of structure as those shown in FIG. 1 illustrative of the first embodiment are identified by the same reference numerals as those shown in FIG. 1 and their detailed description will therefore be omitted.

In the second embodiment, a control circuit 6 has an NPN type second switch transistor 6e corresponding to the switch transistor 6a employed in the first embodiment. A circuit equivalent to the voltage divider circuit 7 employed in the first embodiment comprises a zener diode 8 whose cathode is connected to a first input terminal 1, and a resistor 10 used to prevent the breakdown of the zener diode 8, which is connected between the anode of the zener diode 8 and the base of the switch transistor 6e.

Here, a zener voltage of the zener diode 8 is set to a minimum value, e.g., 7V lying in a voltage range for normally activating a load. Thus, the switch transistor 6e is not turned on unless a voltage greater than the zener voltage of the zener diode 7c is applied between the input terminals 1 and 2. Consequently, since no voltage is applied across the load when the voltage to be supplied from the external power supply is low (less than or equal to 7V), a failure in load, a malfunction thereof, the shortening of life of the external power supply, etc. can be prevented from occurring.

Figure 3:
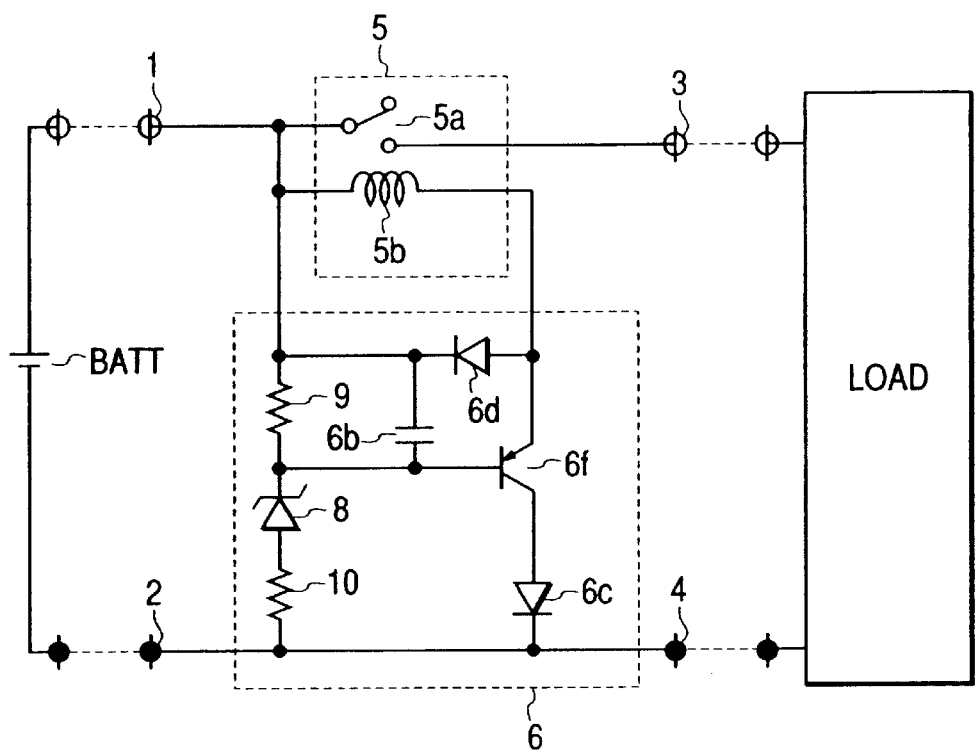
FIG. 3 is a circuit diagram depicting a third embodiment of a power-supply anti-reverse connection circuit of the present invention.

Next, FIG. 3 is a circuit diagram showing a third embodiment of a power-supply anti-reverse connection circuit of the present invention. In FIG. 3, the same elements of structure as those shown in FIG. 2 illustrative of the second embodiment are identified by the same reference numerals and their detailed description will therefore be omitted.

In FIG. 3, a control circuit 6 has a PNP type third switch transistor 6f equivalent to the switch transistor 6e employed in the second embodiment. As distinct from the second embodiment, the anode of a zener diode 8 whose cathode is connected to the base of the switch transistor 6f, is connected to an input terminal 2 through a resistor 10 for the prevention of breakdown. A bias resistor 9 is connected between an input terminal 1 and the base of the switch transistor 6f. Further, a capacitor 6b for noise elimination is connected between the input terminal 1 and the base of the switch transistor 6f.

Figure 4:
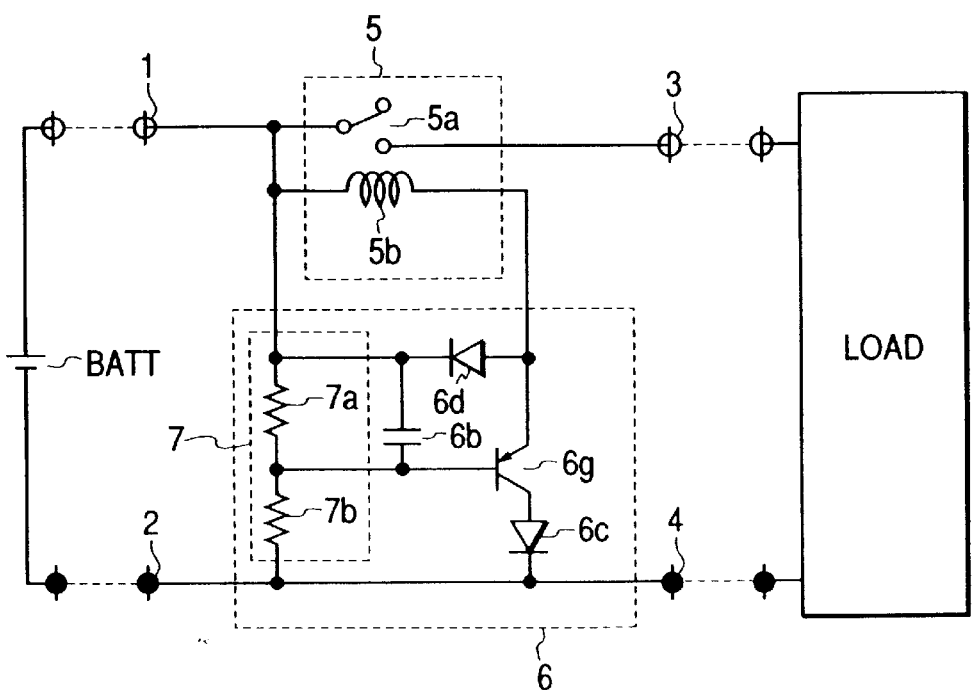
FIG. 4 is another circuit diagram showing another embodiment of a power-supply anti-reverse connection circuit of the present invention.

Next, FIG. 4 is a circuit diagram showing another embodiment of a power-supply anti-reverse connection circuit of the present invention. In FIG. 4, the same elements of structure as those shown in FIG. 1 illustrative of the first embodiment are identified by the same reference numeral as those shown in FIG. 1 and their detailed description will therefore be omitted.

In FIG. 4, a control circuit 6 has a PNP type fourth switch transistor 6g corresponding to the switch transistor 6a employed in the first embodiment. As distinct from the first embodiment, a capacitor 6b for noise elimination is connected between an input terminal 1 and the base of the switch transistor 6g.

Figure 5:
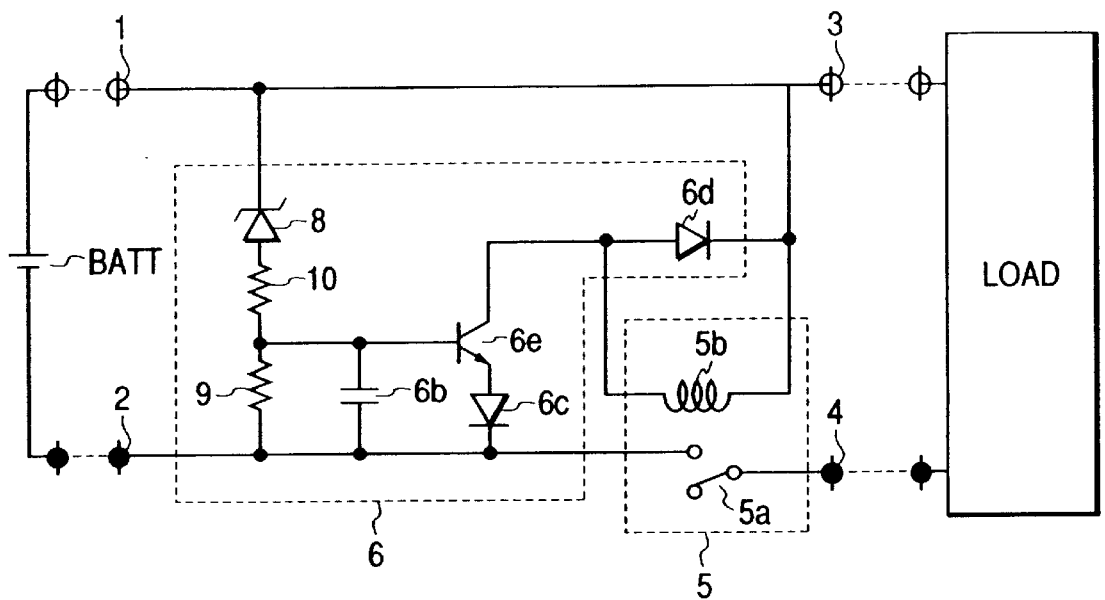
FIG. 5 is a further circuit diagram illustrating a further embodiment of a power-supply anti-reverse connection circuit of the present invention.
Figure 6:
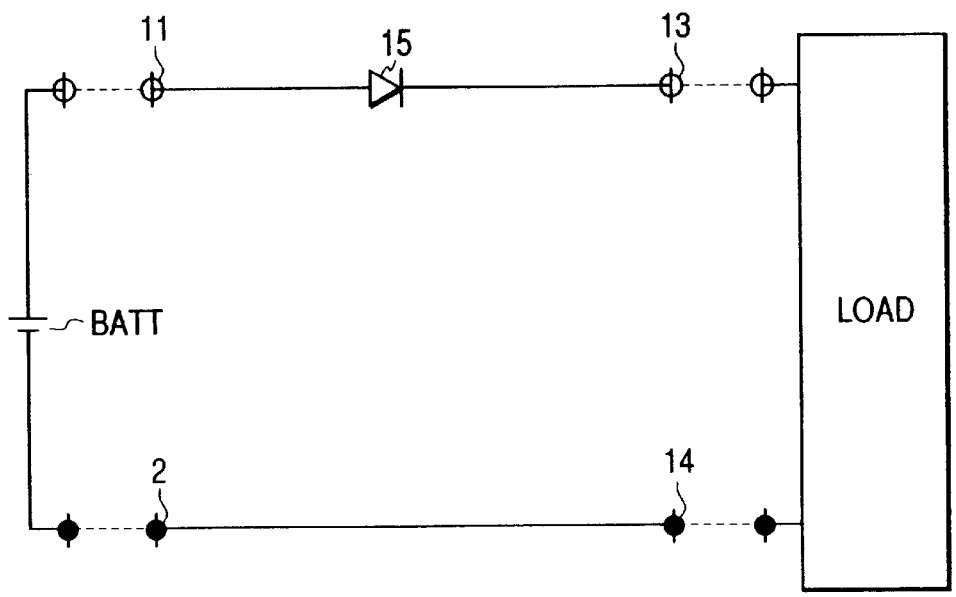
FIG. 6 is a circuit diagram showing an embodiment of a conventional power-supply anti-reverse connection circuit.

Next, FIG. 5 is a circuit diagram showing a further embodiment of a power-supply anti-reverse connection circuit of the present invention. In FIG. 5, the power-supply anti-reverse connection circuit is one wherein the normally opened contact 5a employed in the second embodiment is provided between an input terminal 2 and a load terminal 4. Since the present power-supply anti-reverse connection circuit is similar to the second embodiment in configuration and operation, their description will be omitted.

While the normally opened contact 5a has been adopted in a relay 5 in the present invention, the object of the present invention can be achieved even if such a configuration that a normally closed contact is adopted and opened only when it is always in a conducting state and a reverse voltage is applied, thereby blocking or cutting off the power supply, is adopted. However, the normally closed contact serves so as to apply the reverse voltage to a load during a period (generally a few milli-seconds) from the application of the reverse voltage to the time when an excitation coil of a relay is energized to activate and open the normally closed contact. When the configuration of the load is a semiconductor or the like, it might deviate from the absolute maximum rating of the semiconductor for a few milli-seconds. Further, when the semiconductor is a complementary type, and a circuit (or IC) having various outputs, of a bridge configuration, there is a danger that large currents (short-circuit currents) flow through diodes (each having rectifying action betwen load terminal of IC and output terminal thereof and having rectifying action between output terminal thereof and positive-polarity terminal thereof) parasitic on output terminals parasitic their semiconductors, thereby leading to the breakdown of a load circuit (or IC).

According to the present invention, since the normally opened contact is provide, no reverse voltage is applied to the load even in a moment, and the risk of the breakdown of the aforementioned circuit (or IC) can reliable be avoided.

What is claimed is:

1. A anti-reverse connection circuit for an external power supply, comprising:

a first input terminal to be connected to a positive polarity of the external power supply;

a second input terminal to be connected to a negative polarity of the external power supply;

a first load terminal to which one end of a load is connected;

a second load terminal to which the other end of the load is connected;

a relay having a normally opened contact and an excitation coil; and a control circuit for allowing a current to flow in the excitation coil, wherein either the first input terminal and the first load terminal, or the second input terminal and the second load terminal, are connected through the normally opened contact, wherein the control circuit has a voltage divider circuit connected between the first input terminal and the second input terminal, and a first switch transistor, wherein the collector and emitter of the first switch transistor are respectively connected to the first input terminal and the second input terminal in such a manner that a current flows from the first input terminal to the second input terminal through the collector and emitter of the first switch transistor when the first switch transistor is turned on, wherein the excitation coil is interposed in a passage through which the current flows, wherein a voltage divided by the voltage divider circuit is applied to the base of the first switch transistor, and wherein the normally opened contact is closed only when the positive polarity of the external power supply is connected to the first input terminal and the negative polarity of the external power supply is connected to the second input terminal to either cause the first input terminal and the first load terminal to be connected, or cause the second terminal and the second load terminal to be connected.

2. The anti-reverse connection circuit for the power supply according to claim 1, wherein the first switch transistor is an NPN type, a capacitor for noise elimination is connected between the base of the first switch transistor and the second input terminal, and an anti-reverse current diode is interposed in a passage through which a current flows from the first input terminal to the second input terminal through the collector and emitter of the first switch transistor when the first switch transistor is turned on.

3. The anti-reverse connection circuit for the power supply according to claim 1, wherein the first switch transistor is a PNP type, a capacitor for noise elimination is connected between the base of the first switch transistor and the first input terminal, and an anti-reverse current diode is interposed in a passage through which a current flows from the first input terminal to the second input terminal through the collector and emitter of the first switch transistor when the first switch transistor is turned on.

4. An anti-reverse connection circuit for an external power supply, comprising:

a first input terminal to be connected to a positive polarity of the external power supply;

a second input terminal to be connected to a negative polarity of the external power supply;

a first load terminal to which one end of a load is connected;

a second load terminal to which the other end of the load is connected;

a relay having a normally opened contact and an excitation coil; and a control circuit for allowing a current to flow in the excitation coil, wherein either the first input terminal and the first load terminal, or the second input terminal and the second load terminal, are connected to each other via the normally opened contact, and the other pair are directly connected to each other, and wherein, when the voltage supplied from the external power supply is lower than a predetermined positive voltage in the case where the positive polarity is connected to the first input terminal and the negative polarity is connected to the second input terminal, the control circuit inhibits the flow of the current in the excitation coil and keeps the normally opened contact open, and either prevents the first input terminal and the first load terminal from being connected, or prevents the second input terminal and the second load terminal from being connected, and when the voltage of the external power supply is higher than the predetermined positive voltage a switch transistor of the control circuit is activated, the control circuit causes the current to flow in the excitation coil, causes the normally opened contact to be closed, and either causes the first input terminal and the first load terminal to be connected, or causes the second terminal and the second load terminal to be connected.

5. The anti-reverse connection circuit for the power supply according to claim 4, wherein the control circuit includes a zener diode whose anode is connected to the second input terminal, a bias resistor connected between the cathode of the zener diode and the first input terminal, and the switch transistor is a PNP type third switch transistor whose collector is connected to the second input terminal and whose emitter is connected to the first input terminal, and the base of the third switch transistor is connected to a point where the zener diode and the bias resistor are connected to each other, and the excitation coil is interposed either between the collector of the third switch transistor and the second input terminal or between the emitter of the third switch transistor and the first input terminal.

6. The anti-reverse connection circuit for the power supply according to claim 5, wherein a capacitor for noise elimination is connected between the base of the third switch transistor and the first input terminal, and an anti-reverse current diode is interposed in a passage through which a current flows from the first input terminal to the second input terminal through the collector and emitter of the third switch transistor when the third switch transistor is turned on.

7. The anti-reverse connection circuit for the power supply according to claim 4, wherein the control circuit includes a zener diode whose cathode is connected to the first input terminal;
- a bias resistor connected between the anode of the zener diode and the second input terminal, and
- the switch transistor is an NPN type second switch transistor of which the collector is connected to the first input terminal and the emitter is connected to the second input terminal, and
- the base of the second switch transistor is connected to a point where the zener diode and the bias resistor are connected to each other, and
- the excitation coil is interposed either between the collector of the second switch transistor and the first input terminal or between the emitter of the second switch transistor and the second input terminal.

8. The anti-reverse connection circuit for the power supply according to claim 7, wherein a capacitor for noise elimination is connected between the base of the second switch transistor and the second input terminal, and
- an anti-reverse current diode is interposed in a passage through which a current flows from the first input terminal to the second input terminal through the collector and emitter of the second switch transistor when the second switch transistor is turned on.

* * * * *

UNITED STATES PATENT AND TRADEMARK OFFICE
CERTIFICATE OF CORRECTION

PATENT NO.   : 6,519,126 B2
DATED        : February 11, 2003
INVENTOR(S)  : Hideki Tamura It is certified that error appears in the above-identified patent and that said Letters Patent is hereby corrected as shown below:

Column 8,
Line 32, insert -- , -- (comma) immediately after "voltage".

Signed and Sealed this

Twenty-second Day of April, 2003

JAMES E. ROGAN
*Director of the United States Patent and Trademark Office*